United States Patent

[11] 3,571,702

[72] Inventor Laszlo Hartner
     Budapest, Hungary
[21] Appl. No. 678,938
[22] Filed Oct. 30, 1967
[45] Patented Mar. 23, 1971
[73] Assignee Tavkozlesi Kutato Intezet
     Budapest, Hungary

[54] APPARATUS FOR THE WIDE-BAND IMPEDANCE MEASUREMENT OF MICRO-WAVE CIRCUITS IN MICRO-WAVE MULTIPLE-POLE ARRANGEMENTS
     1 Claim, 1 Drawing Fig.

[52] U.S. Cl. .................................................. 324/58
[51] Int. Cl. ............................................. G01n 27/04
[50] Field of Search .................................... 324/58,
                                         58.5, (C), 57 (SI), 77 (C)

[56]          References Cited
        UNITED STATES PATENTS
2,520,604  8/1950  Linder ..................... 324/58.5(C)X
2,682,033  6/1954  Smullin .................... 324/58(C)
3,199,024  8/1965  Manly et al. ............... 324/57(SI)
3,398,364  8/1968  Rittenbach ................ 324/77(C)

Primary Examiner—Edward E. Kubastewicz
Attorney—Young and Thompson

ABSTRACT: A process for the wideband measurement of the impedance of microwave current circuits in microwave multiple pole arrangements, i.e., N ports. Into at least one cavity resonator comprised by the N port to be measured a signal is introduced which is so reflected by adjustable reference planes that, in the event of resonance, the signal reflected via the N-port to be measured from the corresponding reference planes is compared with signals introduced into the individual cavity resonators. In the cavity resonators the geometrical spacings (electrical lengths) existing between any desired reference planes are transmitted in the form of electrical signal differences to the indicator apparatus of a synchro receiver system. By means of the tuning elements of the cavity resonators, which are moved in synchronism with the wobbulators energizing the cavity resonators, there is a flow through the corresponding frequency band such that the signals reflected by the reference planes of the cavity resonators are transformed with the aid of the systems assembled therewith (microwave, low frequency, electromechanical systems). The impedances to be measured are continuously indicated in dependency on the frequency.

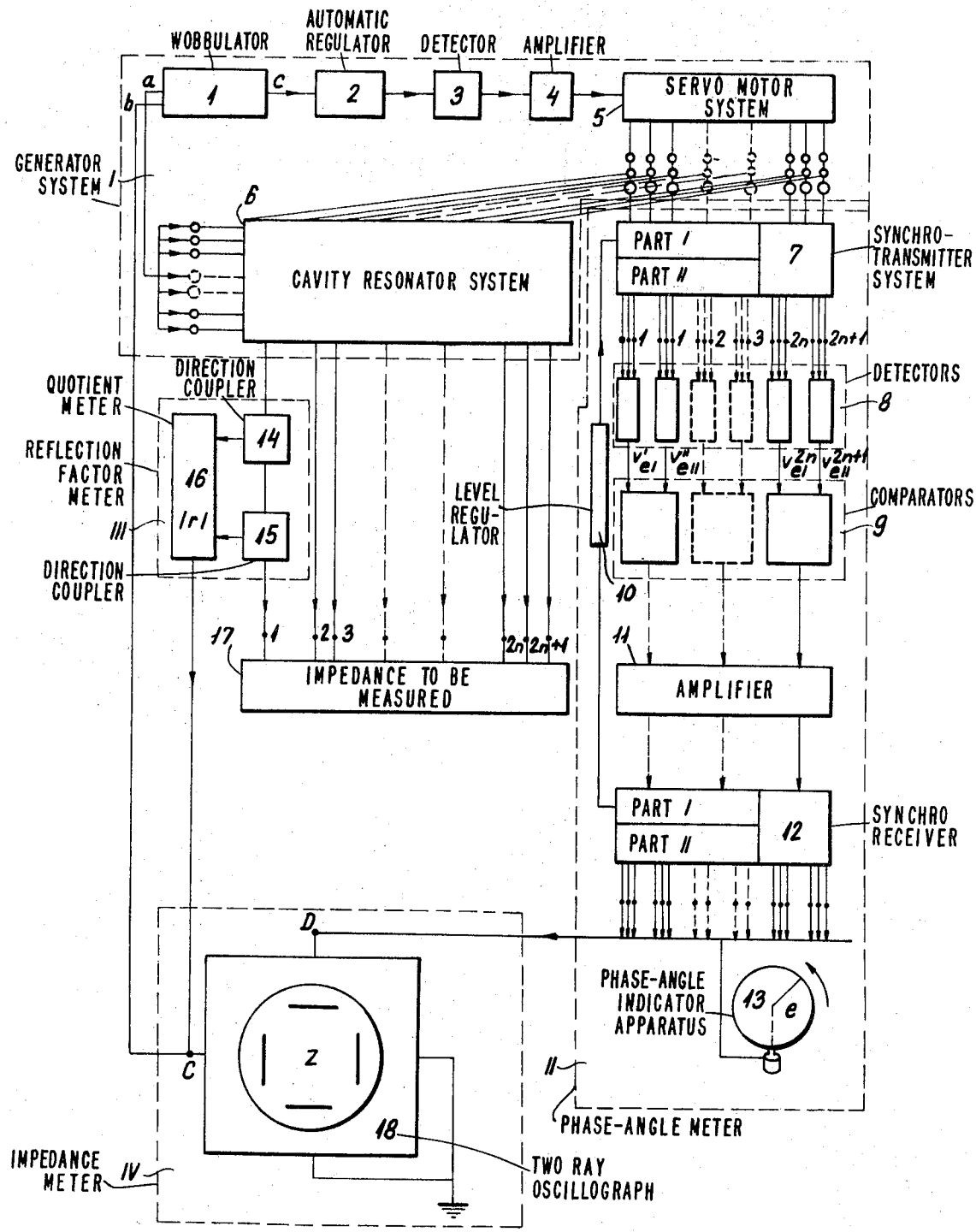

APPARATUS FOR THE WIDE-BAND IMPEDANCE MEASUREMENT OF MICRO-WAVE CIRCUITS IN MICRO-WAVE MULTIPLE-POLE ARRANGEMENTS

Several methods are known for ascertaining the loss factors and phase angles, i.e. the impedances of microwave circuits. The known methods may, with regard to the circuits to be measured, be divided into two large measurement groups, i.e.:

1. The measurement of microwave two-pole and four-pole arrangements (Microwave Engineering by A.F. Harvey; 1963);
2. The measurement of multiple pole arrangements i.e., N-ports.

The measurement of measurement of multiple pole measurement groups is examined, since this group constitutes a basis for comparison relatively to the invention. For the measurement of microwave N-ports, it is known to employ indirect and direct measuring methods. The indirect methods are carried into effect on the basis of methods based on the so-called equivalent or replacement principles ("Handbook of microwave measurements" by Moe Wind and Harold Rappaport, 1954). With regard to the direct measurements, mention may be made of the resonance transformation method (Hungarian Specification No. 151,512). Since of the two last-mentioned methods, the latter is the more progressive, this will be employed as a basis for comparison.

In the case of the known resonance transformation measuring methods, the ascertainment of the loss factor, of the phase angle, of the impedance of any desired microwave N-port by means of a single measurement is made possible in consequence of the fact that, in a cavity resonator which consists of a plurality of transmission line sections corresponding to the number of terminals, the elements varying the geometry are calibrated in advance, at a prescribed frequency, to the phase angle and the indicator apparatus to be used in the measurement is calibrated at the same frequency to the loss factor. The multiple pole to be measured is connected between the transmission line sections calibrated in this manner and is tuned to resonance at the prescribed frequency, the values of the phase angle and of the loss factor being simultaneously read off or, if appropriate calibration is provided, the impedance values may be directly ascertained.

The process according to the invention comprises a novel utilization of the impedance measurement method according to the process of resonance-impedance-transformation. It is the object of the invention to make possible the automatic broadband measurement of microwave circuits, of the so-called microwave $2n$ or $2n+1$ multiple poles.

The known resonance transformation method is simultaneously suitable only for measurement at a single frequency. The process according to the invention makes automatic wideband measurement possible.

The process according to the invention consists in that there is introduced into at least one cavity resonator comprised by the N-port to be measured a signal which is reflected by adjustable reference planes, so that at resonance, via the multiple pole to be measured, the signal reflected by the corresponding reference planes is compared in the cavity resonators with the signals introduced into the individual cavity resonators, and that furthermore the geometrical spacings (electrical lengths) obtaining in the cavity resonators between any desired reference planes are, in the form of electrical signal differences, conveyed to the indicator apparatus of a synchro receiver system and the tuning element of the cavity resonators moving in synchronism with the wobbulator energizing the cavity resonators are tuned through the desired frequency band such that the cavity resonators, by means of the systems (microwave, low frequency, electro mechanical systems) connected with them, continuously indicate, in frequency, the impedances to be measured.

The mathematical basis of the process according to the invention consists on the one hand in that the elementary energy functions $P_1(x, y, z \ldots n, \omega_1, \omega_2 \ldots \omega_n)$, $P_2(x,y,z \ldots n, \omega_1, \omega_2 \ldots \omega_n) \ldots P_n(x,y,z \ldots n,\omega_1, \omega_2 \ldots \omega_n)$ energy quantity $P_{v1}, P_{v2} \ldots P_{vn}$ in the unit volumes $V_1, V_2 \ldots V_n$ of the cavity resonators are continuous and the differential quotients of $n^{th}$ order obtain, $x, y, z \ldots n$ signifying the orthocoordinates, $\omega_1, \omega_2 \ldots \omega_n$ the angular or circular frequency and $P_{v1}, P_{v2} \ldots P_{vn}$ the units of the electromagnetic energy.

The functions available between the reference planes of the cavity resonators, $\eta_1(x, y, z \ldots n, \omega_1, \omega_2 \ldots \omega_n)$, $\eta_2(x, y, z \ldots n, \omega_1, \omega_2 \ldots \omega_n) \ldots \eta_n(x, y, z \ldots n, \omega_1, \omega_2, \ldots \omega_n)$ of the impedance transformation are continuous, in which connection the impedance functions $Z_1(\eta_1, \eta_2 \ldots \eta_n)$, $Z_2(\eta_1, \eta_2 \ldots \eta_n) \ldots Z_n(\eta_1, \eta_2, \ldots \eta_n)$ of the quantities $A_1, A_2, \ldots A_n$ formed by any desired reference planes are homeomorphous to any desired impedance quantities $A_1^x, A_2^x \ldots A_n^x$. The functions $Z_1(\eta_1, \eta_2 \ldots \eta_n)$. $Z_2(\eta_1,\eta_2 \ldots \eta_n) \ldots Z_n(\eta_1,\eta \ldots \eta_n)$ are double-image forming functions, and consequently also the impedance functions $Z_1^{11}(\eta_1, \eta_2 \ldots \eta_n), Z_2^{11}(\eta_1, \eta_2, \ldots \eta_n) \ldots Z_n(\eta_1, \eta_2 \ldots \eta_n)$ indicated at the impedance quantities $A_1^x, A_2^x \ldots A_n^x$ by any desired reference planes are also homeomorphous relative to the impedance quantities $A_1, A_2 \ldots A_n$.

The measuring process according to the invention for the measurement of loss factors, of the phase angle and of the impedances of microwave circuits, that is microwave multiple poles, makes automatic wideband measurement possible in consequence of the face that on the one hand;

1. Each resonant cavity resonator operates as a wobbulator and the electromagnetic system operating in synchronism therewith produces the phase of the impedance to be measured and; on the other hand
2. A direction coupler pair is connected, in cascade arrangement, to a basic cavity resonator selected from $2n$ or $2n+1$ cavity resonators, and a quotient measuring means connected to the detectors of the direction coupler pair produces the reflection factor of the impedance to be measured.

Furthermore, the electrical signals obtained in accordance with points 1 and 2 produce, on the screen of appropriate double-ray oscillographs, in the rectangular or in the polar coordinate system, simultaneously the reflection factor ($\Gamma$) and the phase angle $\theta$ and, on a cartographical oscillograph, directly, the magnitude of the impedance to be measured.

Apparatus for practicing the process according to the invention consists of the following main components.

I. Generator system, containing a wobbulator, an automatic regulator, a detector, an amplifier, a servomotor, and a cavity resonator system.

II. a Phase Measuring System, having at least one cavity resonator, which is tunable in the measuring zone and is calibrated to at least one frequency, and a servomotor synchro system connected to the driving shaft of the pistons for adjusting the reference planes of the cavity resonator, the servomotor synchro system being electrically connected to a system consisting of a detector, a comparator, an amplifier, and a synchro receiver system calibrated in phase angle values.

III. A Measuring System for the reflection factor. Connected to the detector output of a direction coupler pair, which is connected to one of the cavity resonators, to the basic cavity in cascade, is a quotient meter calibrated in reflection factor values.

IV. Impedance Measurement System. This consists of a double-ray oscillograph which is simultaneously calibrated in reflection, factor and phase angle values or, directly in impedance values.

An example of embodiment of the measuring device is discussed in greater detail with reference to the drawings.

The device consists, as already mentioned, of four main parts. These are:

I. The Generator System.
II. The Phase Measurement System.
III. The Reflection Factor Measuring Means
IV. The Impedance Measuring Means.

These parts are described hereinbelow.

I. The Generator System.

The microwave signal is transmitted by a wobbulator 1. The microwave signal $a$ is introduced into a cavity resonator 6 and there is simultaneously obtained from a signal $\iota$ proportional to the same microwave signal frequency, via an automatic regulator 2, a detector 3 and an amplifier 4, a regulated, detected and amplified voltage for control of a servomotor system 5, by means of which the cavity resonator system 6 is tuned to the specific resonance, synchronous with the wobbulator 1, in the zone adjusted at the wobbulator 1.

II. Phase Angle Meter

Corresponding to the transmission ratio between the cavity resonator system 6 and a synchro transmitter system 7, consisting of parts I and II-part I of the synchro transmitter 7 yields the voltages associated with resonances of the unloaded cavity resonators at the calibration reference planes, which said voltages are regulated at the level regulator 10 between the part I of the synchro transmitter and the part I of a synchro receiver 12, the part II of the synchro transmitter 7 yielding those voltages associated, at resonance, with the reference planes of the cavity resonators loaded by the impedances to be measured. The single voltages produced by parts I and II of the synchro transmitter 7 are, after detecting, fed into a detector 8 at a comparator 9 in which the sign-correct voltage differences are formed; these differences are, after amplification at the amplifier 11, conveyed to the parts I and II of the synchro receiver which, at the indicator 13, directly produces the phase-angle of the impedance 17 to be measured. Thus, the tuner elements of the cavity resonator are in mechanical connection with the transmitting unit of the synchro system and the receiver unit of the synchro system is in mechanical or electrical connection with the indicator. The transmitter and the receiver unit are in direct connection or it is a level regulator interconnected and a transmission may be achieved between the moving of the synchro transmitter and synchro receiver.

III. The Measurement of the Reflection Factors

The reflection differences of the reflection factors $\Gamma_1, \Gamma_2 \ldots \Gamma_{2n+1}$, which appear in the cavity resonator system 6 at resonance of the unloading resonators, in the calibration planes, and of the reflection factors $\Gamma_1{}^x, \Gamma_2{}^x \ldots \Gamma_{2n+1}$, which appear in the reference planes at resonance of the cavity resonators loaded by the impedance to be measured, produce, with corresponding calibration at a quotient meter 16 which is connected to the detectors of a coupling rectifier pair 14, 15, the reflection factor of the impedance 17 to be measured. The coupling rectifier pair 14, 15 is connected to the first basic cavity resonator.

IV. Impedance Meter

At resonance of the cavity resonator system loaded by the impedance 17 to be measured, the signals received from the quotient meter 16 and from the synchro receiver system may be fed to the deflector plates of a double-ray oscillograph 18, calibrated by a marker signal $c$, so that, on the screen of the said oscillograph, the reflection factor ($\Gamma$) and the phase angle $\theta$ may be simultaneously read off in the orthogonal or in the polar coordinate system, or, if the screen is calibrated directly as a Smith diagram, the impedance Z may be directly read off.

The calibration of the metering device may be effected in accordance with the number of terminal pairs of the impedance to be measured.

In the measurement of two-pole arrangements, calibration is effected in the following manner.

The pair of terminals 1 and 2 of the impedance 17 to be measured is short-circuited. The wobbulator and the servomotor system are started up and also part I of the synchro transmitter is switched in, the calibration value of the reflection factor being adjusted at the quotient meter and the calibration value of the phase angle being adjusted at the indicator apparatus. Simultaneously, the amplification of the oscillograph is regulated in such manner that the calibration point appears on the outer periphery of the Smith diagram.

When calibrating the device for multipole measurement, the various terminal pairs are connected with an uncharged transmission line system having dimensions and arrangement corresponding to the multiple pole to be measured; subsequently, the servomotors of the cavity resonators and the synchro transmitter system are put into operation, the cavity resonators being adjusted to their resonances. Calibration subsequently takes place in the same manner as already described with reference to the two-pole arrangement.

The measurement may take place in accordance with the number of pairs of terminals of the impedance to be measured.

In the measurement of a two-pole arrangement, the latter is connected to the terminals 1 and 2 of the metering device. The channels 1 and 2 of the servomotor are put into operation, the pair of channels 1 and 2 of parts I and II of the synchro transmitter and of the receiver being switched in, and the reflection, phase and impedance values of the impedance values to be measured are ascertained.

The measurement of an N-port takes place in such manner that the terminals of the N-port are connected either one after the other or simultaneously and the individual measuring or metering channels are switched in one after the other or simultaneously, all the reflection, phase and impedance values being read off simultaneously from the individual indicator appliances.

I claim:

1. The apparatus for the wide band measurement of the impedance in a microwave N-port comprising: a generator system; a phase angle meter; a reflection coefficient meter; and an impedance meter; said generator system containing a wobbulator having a plurality of outputs, an automatic regulator, a detector, an amplifier, a servomotor, and a cavity resonator system having at least one cavity resonator element and a tuning element for each resonator element, one output of said wobbulator connected to the input of said automatic regulator, another output connected to the input of each resonator element, the automatic regulator, detector, amplifier and servomotor connected in series and the output of said servomotor system being connected to control each tuning element; said phase angle meter containing a synchro transmitter system, a detector, a comparator, an amplifier, a synchro receiver, a phase indicating element and a level regulator, the input to said transmitter being connected to said output of said servosystem and to said level detector, the detector of said transmitter, the comparator, the amplifier of said transmitter and said receiver being connected between said transmitter and said phase indicating element; said reflection coefficient meter containing a directional coupler pair and a ratio meter, said directional coupler adapted for coupling the impedance under test to the output of said cavity resonator system and said ratio meter connected to the outputs of said directional coupler pair; and said impedance meter containing a two-ray oscillograph having a pair of inputs, a further output of said ratio meter connected to one input of said oscillograph and the output of said receiver being connected to the other input of said oscillograph.